(12) United States Patent
Chen et al.

(10) Patent No.: US 8,391,716 B2
(45) Date of Patent: Mar. 5, 2013

(54) SIGNAL TRANSMISSION METHOD FOR PEER-TO-PEER OPTICAL NETWORK AND SYSTEM THEREOF

(75) Inventors: Hsing-Yu Chen, Hsinchu (TW); Jye-Hong Chen, Hsinchu (TW); Maria C. Yuang, Hsinchu (TW); Po-Lung Tien, Hsinchu (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 269 days.

(21) Appl. No.: 13/015,137

(22) Filed: Jan. 27, 2011

(65) Prior Publication Data

US 2012/0141129 A1    Jun. 7, 2012

(30) Foreign Application Priority Data

Dec. 7, 2010 (TW) ............................... 99142524 A

(51) Int. Cl.
*H04B 10/00* (2006.01)
(52) U.S. Cl. ............................................ 398/72; 398/73
(58) Field of Classification Search ............... 398/66–73
See application file for complete search history.

(56) References Cited

U.S. PATENT DOCUMENTS

| | | | | |
|---|---|---|---|---|
| 6,721,506 B1* | 4/2004 | Lam | ................................ | 398/70 |
| 7,095,958 B1* | 8/2006 | Woodward | ....................... | 398/72 |
| 7,197,246 B2* | 3/2007 | Shimomura et al. | ............ | 398/83 |
| 7,340,170 B2* | 3/2008 | Park et al. | ........................ | 398/67 |
| 7,394,984 B1* | 7/2008 | Woodward | ....................... | 398/72 |
| 7,551,855 B2* | 6/2009 | Zami et al. | ....................... | 398/82 |
| 7,865,081 B1* | 1/2011 | Woodward | ....................... | 398/72 |
| 7,978,976 B2* | 7/2011 | Pohjola et al. | ................... | 398/72 |
| 8,023,824 B2* | 9/2011 | Yu et al. | ........................... | 398/72 |
| 8,086,102 B2* | 12/2011 | Kim et al. | ....................... | 398/67 |
| 8,270,833 B2* | 9/2012 | Lin et al. | .......................... | 398/72 |
| 2003/0161637 A1* | 8/2003 | Yamamoto et al. | ......... | 398/167.5 |
| 2004/0091265 A1* | 5/2004 | Kim et al. | ....................... | 398/72 |
| 2005/0259988 A1* | 11/2005 | Jung et al. | ........................ | 398/72 |
| 2006/0093359 A1* | 5/2006 | Lee et al. | ........................ | 398/70 |
| 2007/0147837 A1* | 6/2007 | Yoo et al. | ......................... | 398/72 |
| 2008/0145056 A1* | 6/2008 | Boldi et al. | ...................... | 398/96 |
| 2008/0187314 A1* | 8/2008 | Chung et al. | .................... | 398/72 |
| 2008/0279556 A1* | 11/2008 | Yu et al. | ........................... | 398/72 |
| 2009/0097852 A1 | 4/2009 | Qian et al. | | |

(Continued)

OTHER PUBLICATIONS

Erkan et al., "Native Ethernet-Based Self-Healing WDM-PON Local Access Ring Architecture: A New Direction for Supporting Simple and Efficient Resilience Capabilities," IEEE International Conference, 2010.

(Continued)

*Primary Examiner* — Agustin Bello
(74) *Attorney, Agent, or Firm* — Muncy, Geissler, Olds & Lowe, PLLC

(57) ABSTRACT

A signal transmission system for a peer-to-peer optical network. The system includes an optical line terminal, an optical distribution node, and a plurality of optical network units. The optical network unit and the optical distribution node are connected in a tree distribution having an ordered relation. The optical line terminal transmits optic signals via the optical distribution node to a first ordered optical network unit, to allow the first ordered optical network unit to process the optic signals and to generate combined optic signals, which are transmitted to a next ordered optical network unit via the optical distribution node. The above steps are iterated, until a last ordered optical network unit transmits combined optic signals to the optical line terminal via the optical distribution node.

13 Claims, 4 Drawing Sheets

U.S. PATENT DOCUMENTS

| | | | | |
|---|---|---|---|---|
| 2009/0185804 A1* | 7/2009 | Kai et al. | | 398/48 |
| 2009/0220230 A1* | 9/2009 | Kim et al. | | 398/72 |
| 2010/0209108 A1* | 8/2010 | Kim et al. | | 398/67 |
| 2010/0215368 A1* | 8/2010 | Qian et al. | | 398/67 |
| 2010/0239253 A1* | 9/2010 | Lin et al. | | 398/63 |
| 2012/0141129 A1* | 6/2012 | Chen et al. | | 398/66 |
| 2012/0237220 A1* | 9/2012 | Presi et al. | | 398/50 |
| 2012/0269515 A1* | 10/2012 | Cvijetic et al. | | 398/72 |

OTHER PUBLICATIONS

Qian et al., "10-Gb/s OFDMA-PON for Delivery of Heterogeneous Services," OFC/NFOEC 2008.

Cvijetic et al., "Orthogonal Frequency Division Multiple Access PON (OFDMA-PON) for Colorless Upstream Transmission Beyond 10 Gb/s," IEEE Journal on Selected Areas in Communications, vol. 28, No. 6, Aug. 2010, pp. 781-790.

* cited by examiner

SIGNAL TRANSMISSION METHOD FOR PEER-TO-PEER OPTICAL NETWORK AND SYSTEM THEREOF

BACKGROUND OF THE INVENTION

1. Field of the Invention

This invention relates to communications methods and systems thereof, and, more particularly, to a signal transmission method for an optical network and a system thereof.

2. Description of Related Art

A peer-to-peer optical network, tree-type optical network, and ring-shaped optical network are three of the most popular optical networks between an optical line terminal and optical network units.

The peer-to-peer optical network system deploys an optical network (e.g., optical fiber network) to connect the optical line terminal to the optical network units. Such a peer-to-peer layout method ensures received signals that have well enough power, but is very expensive.

In a ring-shaped network, the optical network units are distributed in the shape of a ring, and the optical line terminal is connected to only one of the optical network units, and is connected to the remaining optical network units via a ring-shaped layout. However, if a part of the ring-shaped optical network is damaged or malfunction, the whole optical network cannot operate normally. One method is introduced to over the problem by providing two times the number of optical fibers that are deployed in the ring-shaped optical network (referring to H. Erkan et al., "Native Ethernet-Based Self-Healing WDM-PON Local Access RING Architecture: A New Direction for Supporting Simple and Efficient Resilience Capabilities", IEEE International Conference, 2010). Since these optical fibers cannot be deployed at the same place and have a total of a great number, such a layout method is very expensive.

In a tree-type optical network, an optical line terminal is connected to a splitter, and connected via the splitter, in a tree distribution, to the optical network units. Such a tree-type layout method has a low cost. However, since the splitter may decay the power of received signals, the optical network unit may receive nothing but those signals that have better sensitivity (referring to D. Qian et al., "10-Gb/s OFDMA-PON for Delivery of Heterogeneous Services", OFC 2008).

In general, the tree-type optical network employs Frequency Division Multiple Access (FDMA). When signals are upstreamed from the optical network unit the optical line terminal, Optical Beat Interferences (OBI) may occur. Accordingly, signal interferences are generated, and the optical line terminal cannot tell the signal transmitted from the optical network units.

In addition to the FDMA, Orthogonal Frequency Division Multiple Access-Passive Optical Network (OFDMA-PON) is developed to increase the transmission efficiency and save costs. However, the technique needs greater signal receiving power.

Another solution uses Wavelength Division Multiplexing Laser among the optical network units (referring "10 Gbps OFDMA-PON", US Patent Application Publication No. 2009/0097852 to Dayou QIAN et al.). However, the temperature of the WDM Laser needs to be controlled, in order to maintain accurate wavelength. Besides, the wavelengths have to be allocated to certain optical network unit in advance. The solution lacks flexibility.

A Colorless architecture (referring to Cvijetic, N. et al., "Orthogonal Frequency Division Multiple Access PON (OFDMA-PON) for colorless upstream transmission beyond 10 Gb/s", IEEE JOURNALS, 2010) may avoid OBI and need no WDM Laser. In this architecture, an optical filter is needed to filtering light, and an optical amplifier is also needed to increase the signal receiving power. Unfortunately, both the optical filter and the optical amplifier are very expensive, and the architecture thus has a high cost.

Since the signal transmission method for an optical network and its related system has the problems of suffering signal interferences, receiving nothing but signals that have greater power, and costing a lot of money, providing a signal transmission method for an optical network and a related system that may solve the above problems is becoming one of the most popular issued in the art.

SUMMARY OF THE INVENTION

In view of the above-mentioned problems of the prior art, the present invention provides a signal transmission method for a peer-to-peer optical network and its related system, to prevent signal interferences, increase the power of received signals, and save cost.

The method is applicable to a peer-to-peer optical network system comprising an optical line terminal, an optical distribution node and a plurality of optical network units, the optical network units connected to the optical distribution node in a tree distribution having an ordered relation. The method comprises the following steps of (1) enabling the optical line terminal to transmit, in a single wavelength, optic signals comprising a plurality of downstream signals corresponding to the optical network units via the optical distribution node to a first ordered optical network unit of the optical network units; (2) enabling the first ordered optical network unit to capture own dedicated downstream signals of the first ordered optical network from the downstream signals of the optic signals, to combine the remaining downstream signals with own dedicated upstream signals of the first ordered optical network to generate combined optical signals, and to transmit the combined optical signals to the optical distribution node; and (3) enabling the optical distribution node to transmit the combined optical signals received from the first ordered optical network unit to a next ordered optical network unit of the optical network units, and iterating step (2), to allow each of the optical network units to acquire own dedicated downstream signals thereof and to combine own dedicated upstream signals of each of the optical network units with the remaining downstream signals in the combined optic signals of a previous ordered optical network unit, and to allow a last ordered optical network unit to transmit the combined optic signals that comprise all of the upstream signals of the optical network units via the optical distribution node to the optical line terminal.

The system includes an optical line terminal for transmitting and receiving optic signals that have a single wavelength; an optical distribution node having a plurality of optical circulators connected and distributed in an order ring, one of the optical circulators connected to the optical line terminal; and a plurality of optical network units connected to the optical circulators in a one-to-one manner, a first ordered optical network unit receiving the optic signals from a first ordered optical circulator, capturing own dedicated downstream signals of the first ordered optical network unit from a plurality of downstream signals of the optic signals, combining the remaining downstream signals of the optic signals with own dedicated upstream signals of the first ordered optical network unit to generate combined optic signals, and transmitting the combined optic signals to the first ordered optical circulator, allowing the first order optical circulator to transmit via a next ordered optical circulator the combined optic signals to a next ordered optical network unit and to capture own dedicated downstream signals of the next ordered optical network and combine the downstream signals with own dedicated upstream signals of the next ordered optical network unit, and to allow a last ordered optical network unit to transmit the combined optic signals that comprise all of the upstream signals of the optical network units via a last ordered optical circulator to the optical line terminal.

Compared with the prior art, the present invention uses the optic signals that have a single wavelength, and employs a system having an ordered relation, to prevent the method and system of the present invention from signal interferences, to enhance the power of received signals, and to save cost.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
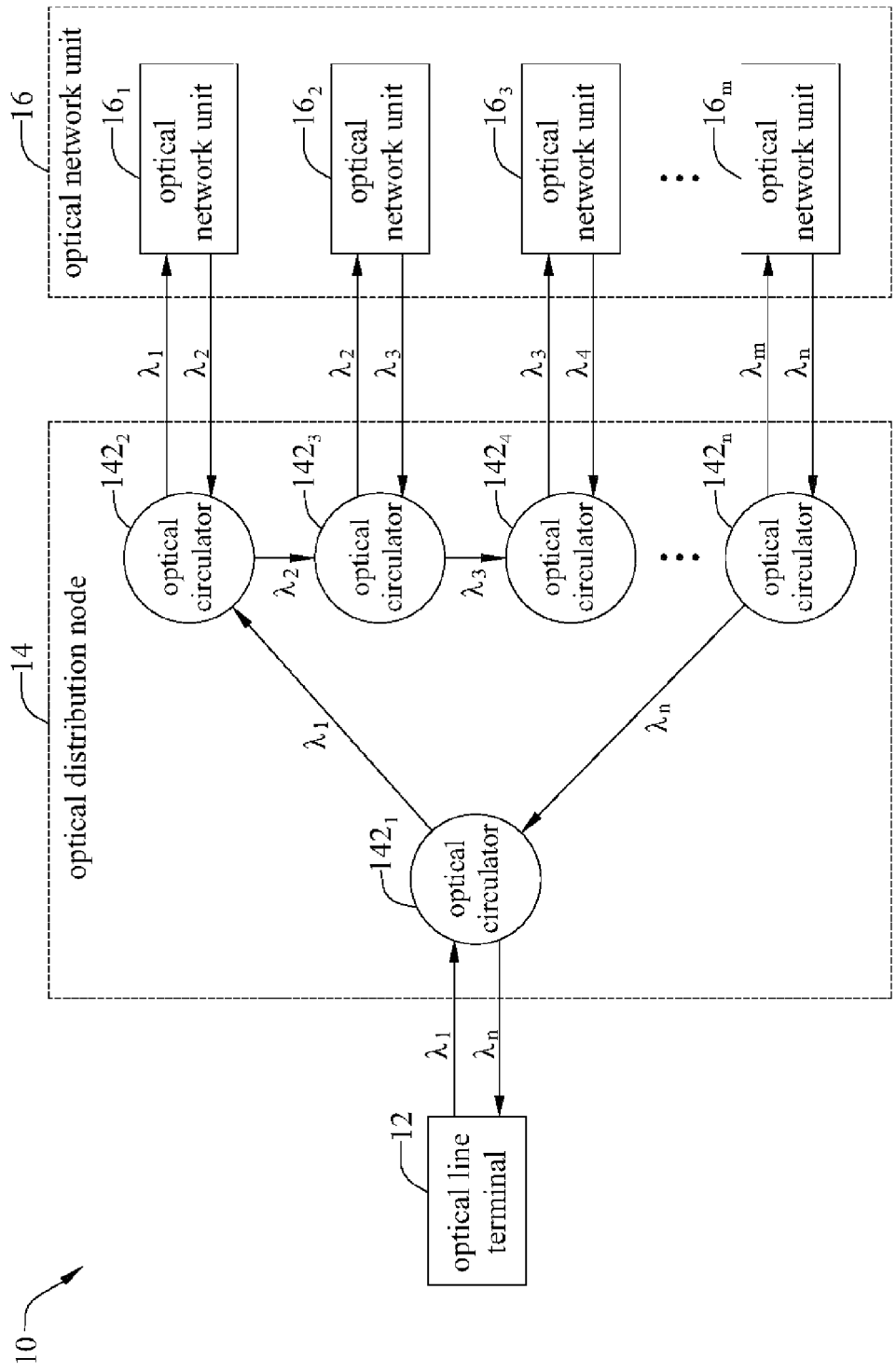
FIG. 1 is a functional block diagram of a signal transmission system for a peer-to-peer optical network according to the present invention.

FIG. 1 is a functional block diagram of a signal transmission system 10 for a peer-to-peer optical network according to the present invention;

The system 10 operates on an optical network, and may be applied to, but is not limited to, OFDMA-PON. The system 10 comprises an optical line terminal (OLT) 12, an optical distribution node (ODD) 14 and an optical network unit (ONU) 16. In an embodiment, the optical network may be an optical fiber network, but is not limited thereto. In the following paragraphs, only the components that relate to the present invention are described, other unrelated components are hereby omitted.

The optical line terminal 12 is applied to a terminal apparatus of a passive optical fiber network, but is not limited thereto. The optical line terminal 12 is connected to the optical distribution node 14, and transmits optic signals $\lambda_1$ that are readily to be transmitted via the optical distribution node 14 to the optical network unit 16 to the optical distribution node 14. The optical line terminal 12 may also receive optic signals $\lambda_n$ transmitted from the optical network unit 16 via the optical distribution node 14. The optic signals $\lambda_1$ include a plurality of downstream signals corresponding to the optical network unit 16, and the optic signals $\lambda_n$ include a plurality of upstream signals corresponding to the optical network unit 16. $\lambda_1$ and $\lambda_n$ are optic signals having a single wavelength.

The optical distribution node 14 is connected to the optical network unit 16 in a tree distribution having an ordered relation. The optical distribution node 14 transmits the optic signals to the corresponding optical network unit 16 and receives the optic signals from the optical network unit 16 according to the ordered relation.

The optical distribution node 14 further comprises a plurality of optical circulator $142_1$, $142_2$, $142_3$, . . . and $142_n$, where n is an integer greater than two, and the optical circulators have a ring distribution and are connected in a clockwise manner. One of the optical circulators, e.g., $142_1$, is connected to the optical line terminal 12. In the embodiment, the number and ordered relation of the optical circulators are exemplified for illustration, and are not used to limit the present invention.

The optical network unit 16 may be applied to a terminal apparatus of a passive optical fiber network, but is not limited thereto. The optical network unit 16 comprises a plurality of optical network units $16_1$, $16_2$, $16_3$, . . . , and $16_m$, where m=n−1, and the optical network unit are connected to their corresponding optical circulators in a one-to-one manner. In the embodiment, the number and ordered relation of the optical circulators are exemplified for illustration, and are not used to limit the present invention. The optical network units receive optic signals from the corresponding optical circulator, capture their own dedicated downstream signals, combine the remaining downstream signals of the optic signals with their own dedicated upstream signals to generate another optic signals (also called "combined optic signals"), and transmit the another optic signals to corresponding optical circulators.

For instance, the optical circulator $142_1$ is connected to the optical line terminal 12, receives the optic signals $\lambda_1$ from the optical line terminal 12, and transmits optic signals $\lambda_1$ via the optical circulator $142_1$ to the optical circulator $142_2$; the optical circulator $142_2$ is connected to the optical network unit $16_1$, receives optic signals $\lambda_1$ from the optical circulator $142_1$, and transmits the optic signals $\lambda_1$ to the optical network unit $16_1$; the optical network unit $16_1$ captures its own dedicated downstream signals, combines the remaining downstream signals of the optic signals $\lambda_1$ with its own dedicated upstream signals to generate the optic signals $\lambda_2$, and transmits the optic signals $\lambda_2$ via the optical circulator $142_2$ to the optical circulator $142_3$; the optical circulator $142_3$ is connected to the optical network unit $16_2$, receives the optic signals $\lambda_2$ from the optical circulator $142_2$, and transmits the optic signals $\lambda_2$ to the optical network unit $16_2$; the optical network unit $16_2$ captures its own dedicated downstream signals, combines the remaining downstream signals of the optic signals $\lambda_2$ with its own dedicated upstream signals to generate optic signals $\lambda_3$, and transmits the optic signals $\lambda_3$ via the optical circulator $142_3$ to the optical circulator $142_4$; likewise, the other the optical circulators transmit optic signals, and the other optical network units capture their own dedicated downstream signals, combine the remaining downstream signals with their own dedicated upstream signals to generate new optic signals, and transmit the new optic signals, until a last optical circulator $142_n$ has completed its operation; the optical circulator $142_n$ is connected to the optical network unit $16_m$, receives optic signals $\lambda_m$ from the optical circulator $142_m$, and transmits the optic signals $\lambda_m$ to the optical network unit $16_m$; the optical network unit $16_m$ captures its own dedicated downstream signals, combining the remaining downstream signals of the optic signals $\lambda_m$ with its own dedicated upstream signals to generate optic signals $\lambda_n$, and transmits optic signals $\lambda_n$ via the optical circulator $142_n$ to the optical circulator $142_1$; the optical circulator $142_1$ receives optic signals $\lambda_n$ from the optical circulator $142_n$, and transmits the optic signals $\lambda_n$ to the optical line terminal 12.

Note that the optic signals $\lambda_1, \lambda_2, \ldots, \lambda_m$, and $\lambda_n$ all have a single wavelength, each of them comprises a plurality of upstream signals, a plurality of downstream signals, or a combination thereof, and they are transmitted in Frequency Division Multiple Access, (FDMA) or Time Division Multiple Access (TDMA) ways, but are not limited thereto.

Figure 2:
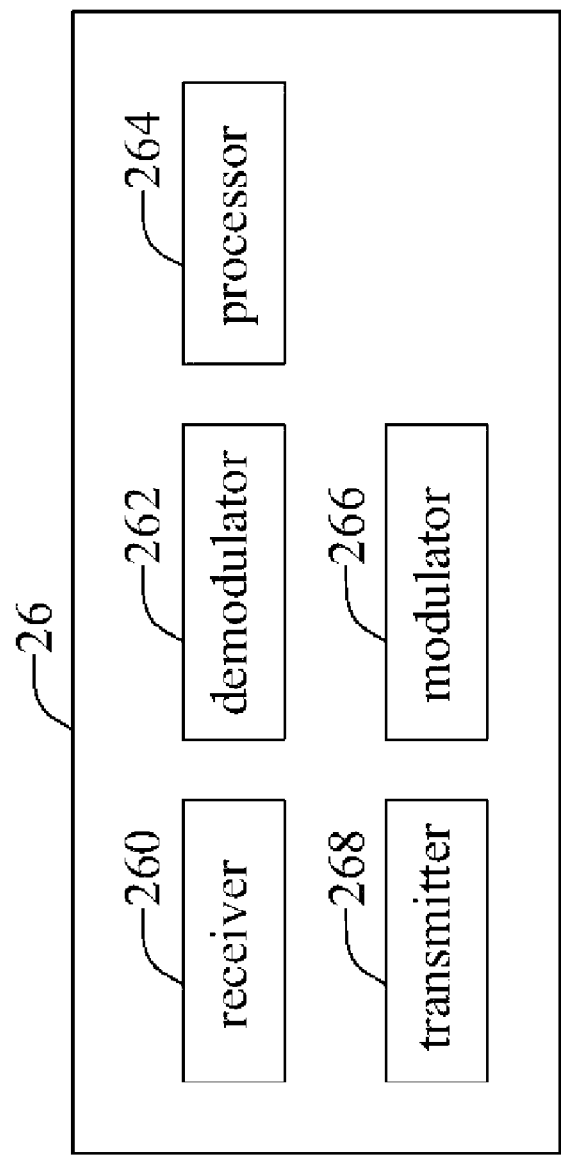
FIG. 2 is a functional diagram of an optical line terminal of an optical network unit according to the present invention.

Please refer to FIG. 2, which is a functional diagram of an optical line terminal of an optical network unit 26 according to the present invention. The optical network unit 26 comprises a receiver 260, a demodulator 262, a processor 264, a modulator 266, and a transmitter 268.

The receiver 260 receives optic signals or combined optic signals, wherein the optic signals indicates signals (e.g., $\lambda_1$) that comprise a plurality downstream signals, and the combined optic signals indicates signals (e.g., the optic signals $\lambda_2, \ldots, \lambda_m$, and $\lambda_n$) that comprise a plurality of upstream signals, downstream signals or a combination thereof. In the following paragraph, "optic signals" represent the signal $\lambda_1$ that is transmitted by the optical line terminal to a first ordered optical network unit, and "combined optic signals" represent the signals $\lambda_2, \ldots, \lambda_m$, and $\lambda_n$ that is generated by combining the dedicated downstream signals captured by the optical network unit with its own dedicated upstream signals.

The demodulator 262 demodulates the above received optic signals or the combined optic signals.

The processor 264 captures downstream signals that correspond to the optical network unit 26 from the demodulated optic signals or combined optic signals, and combines the remaining downstream signals (except the dedicated downstream signals of the optical network unit 26) of the optic signals with upstream signals dedicated to the optical network unit 26. The modulator 266 remodulates the above combined signals and generate new combined optic signals.

The transmitter 268 transmits the above remodulated combined optic signals.

Figure 3:
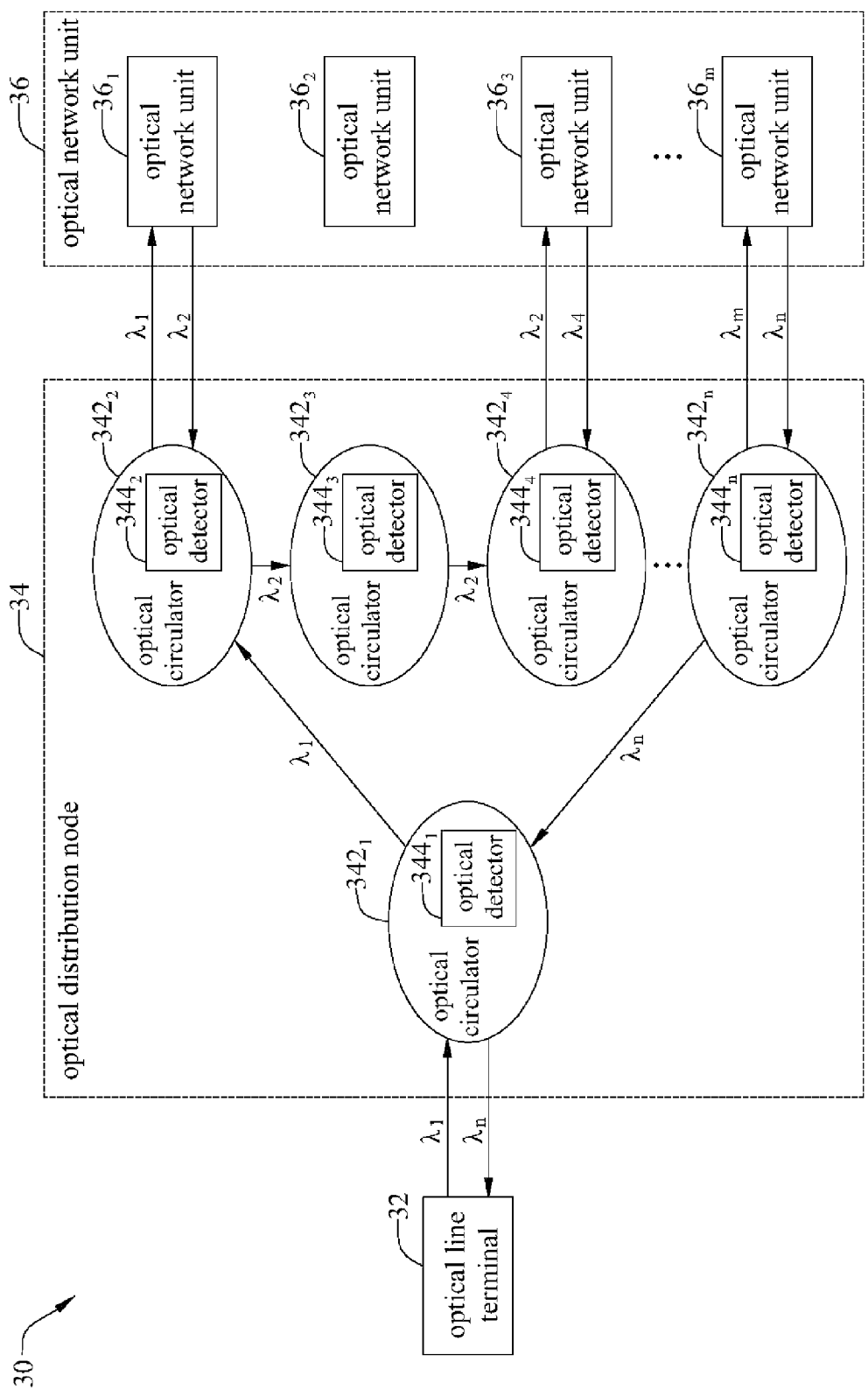
FIG. 3 is a functional block diagram of another signal transmission system for a peer-to-peer optical network according to the present invention.

Please refer to FIG. 3, which is a functional block diagram of another signal transmission system 30 for a peer-to-peer optical network according to the present invention. The system 30 differs from the system 10 in that optical circulator $342_1, 342_2, 342_3, \ldots,$ and $342_n$ in the system 30 have optical detector $344_1, 344_2, 344_3, \ldots,$ and $344_n$, respectively. In an embodiment, the optical circulators are bypass circulators, but are not limited thereto. The system 30 is applied to the same environment as that of the system 10, and further description is hereby omitted.

The optical detectors detect whether an optical network between the optical circulators and their corresponding optical network units is damaged or malfunctioned. In other words, the optical detectors detect whether the optic signals can be transmitted between the optical circulators and their corresponding optical network units. If the detection result indicates that the optic signals can be transmitted, that is the optical network is not damaged or malfunctioned, the optical circulators transmit the optic signals to their corresponding optical network units; on the contrary, if the detection result indicates that the optic signals cannot be transmitted, that is the optical network is damaged or malfunctioned, the optical circulators transmit the optic signals directly to a next ordered optical circulator. Therefore, in the system 30 even if the optical network between the optical circulator and its corresponding optical network unit is damaged or malfunctioned, the system 30 can still operate normally.

For instance, when the optic signals $\lambda_2$ are generated by the optical network unit $36_1$ and transmitted via the optical circulator $342_2$ to the optical circulator $342_3$, the optical detector $344_3$ may be used to detect whether an optical network between the optical circulator $342_3$ and the optical network unit $36_2$ is damaged or malfunctioned. If the detection result indicates that the optical network is not damaged or malfunctioned, the optical circulator $342_3$ transmits the combined optic signals $\lambda_2$ to the optical network unit $36_2$; on the contrary, if the detection result indicates that the optical network is damaged or malfunctioned, the optical circulator $342_3$ transmits the combined optic signals $\lambda_2$ directly to the next ordered optical circulator $342_4$.

Figure 4:
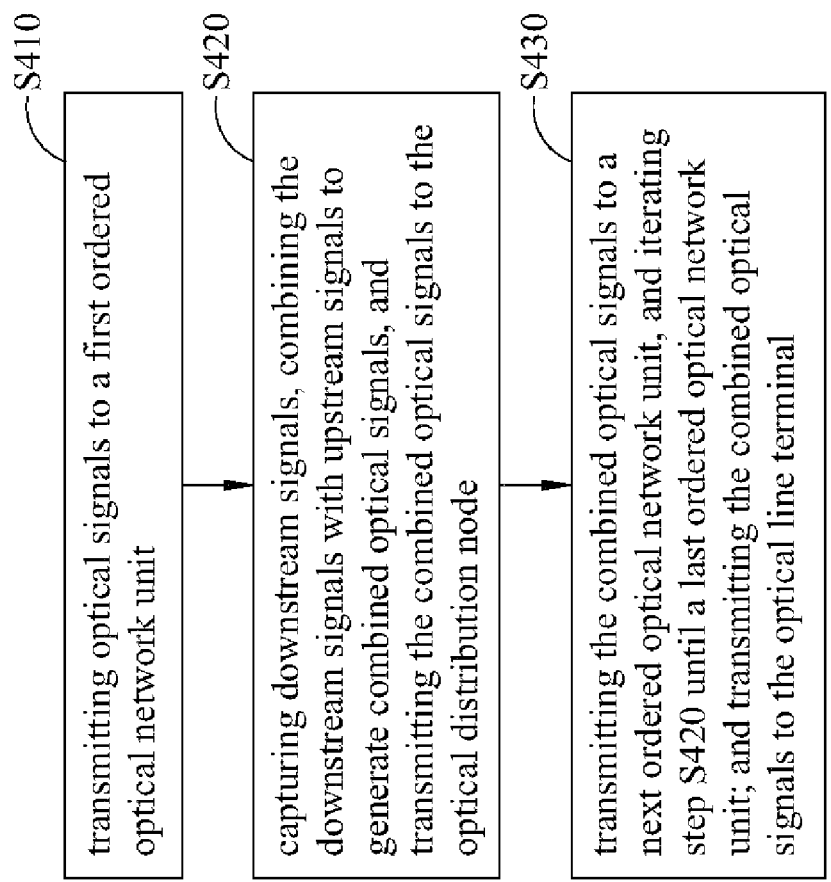
FIG. 4 is a flow chart of a signal transmission method for a peer-to-peer optical network according to the present invention.

A flow chart of a signal transmission method for a peer-to-peer optical network according to the present invention is described in accordance with the functional block diagrams of FIGS. 1-3. Please refer to FIG. 4, which is a flow chart of a signal transmission method for a peer-to-peer optical network according to the present invention.

In step S410, a optical line terminal is enabled to transmit, in a single wavelength, optic signals comprising a plurality of downstream signals corresponding to the optical network units via the optical distribution node to a first ordered optical network unit in a plurality of optical network units.

In step S420, the first ordered optical network unit is enabled to receive the optic signals, demodulate the optic signals, capture its own dedicated downstream signals, combine the remaining downstream signals of the optic signals with its own dedicated upstream signals to remodulate and generate combined optic signals, and transmit the combined optic signals to the optical distribution node.

In step S430, the optical distribution node is enabled to transmit the combined optic signals received by the first ordered optical network unit to a next ordered optical network unit, and step S420 is iterated, including receiving the combined optic signals, demodulating the combined optic signals, capturing the dedicated downstream signals, combining the remaining downstream signals of the optic signals with the dedicated upstream signals to remodulate and generate new combined optic signals, and transmitting the new combined optic signals to the optical distribution node, allowing each of the optical network units to acquire its own dedicated downstream signals and combine the remaining downstream signals of the optic signals with its own dedicated upstream signals to generate another combined optic signals, and allowing a last ordered optical network unit to transmit, in a single wavelength, the combine optic signals that include the upstream signals corresponding to the optical network units via the optical distribution node to the optical line terminal.

Step S410 may comprise the following steps of: enabling the optical distribution node to detect whether the optic signals can be transmitted to the first ordered optical network unit; if the optic signals can be transmitted, proceed to step S420, or the optic signals are transmitted to a next ordered optical network unit and step S420 is executed.

Step S430 may comprise the following steps of: enabling the optical distribution node to detect whether the combined optic signals can be transmitted to a next ordered optical network unit; if the combined optic signals can be transmitted, subsequent steps are executed, or the combined optic signals are transmitted to a next ordered optical network unit and subsequent steps are executed.

In sum, the embodiments use the optic signals that have a single wavelength, and employ a system having an ordered relation, to prevent the method and system of the present invention from signal interferences, to enhance the power of received signals, and to save cost.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A signal transmission method for a peer-to-peer optical network system comprising an optical line terminal, an optical distribution node and a plurality of optical network units, the optical network units connected to the optical distribution node in a tree distribution having an ordered relation, the method comprising the following steps of:
   (1) enabling the optical line terminal to transmit, in a single wavelength, optic signals comprising a plurality of downstream signals corresponding to the optical network units via the optical distribution node to a first ordered optical network unit of the optical network units;
   (2) enabling the first ordered optical network unit to capture own dedicated downstream signals of the first ordered optical network from the downstream signals of the optic signals, to combine the remaining downstream signals with own dedicated upstream signals of the first ordered optical network to generate combined optical signals, and to transmit the combined optical signals to the optical distribution node; and
   (3) enabling the optical distribution node to transmit the combined optical signals received from the first ordered optical network unit to a next ordered optical network unit of the optical network units, and iterating step (2), to allow each of the optical network units to acquire own dedicated downstream signals thereof and to combine own dedicated upstream signals of each of the optical network units with the remaining downstream signals in the combined optic signals of a previous ordered optical network unit, and to allow a last ordered optical network unit to transmit the combined optic signals that comprise all of the upstream signals of the optical network units via the optical distribution node to the optical line terminal.

2. The method of claim 1, wherein step (2) further comprises the following steps of:
   (2-1) enabling the first ordered optical network unit to demodulate the optic signals;
   (2-2) enabling the first ordered optical network unit to capture the own dedicated downstream signals thereof; and
   (2-3) enabling the first ordered optical network unit to combine the remaining downstream signals of the optic signals with the own dedicated upstream signals thereof to re-modulate and generate combined optic signals, and to transmit the combined optic signals to the optical distribution node.

3. The method of claim 2, wherein step (3), after the next ordered optical network unit receives the combined optic signals modulated and generated by the first ordered optical network unit from the optical distribution node, further comprises the following steps:
   (3-1) demodulating the combined optic signals;
   (3-2) capturing the own dedicated downstream signals thereof; and
   (3-3) combining the remaining downstream signals of the optic signals with the own dedicated upstream signals thereof to remodulate and generate another combined optical signal, and transmitting the another combined optical signal to the optical distribution node.

4. The method of claim 1, wherein step (1) further comprises: enabling the optical distribution node to detect whether it can transmit the optic signals to the first ordered optical network unit; and, if no, transmitting the optic signals to a next ordered optical network unit and executing step (2).

5. The method of claim 1, wherein step (3) further comprises: enabling the optical distribution node to detect whether it can transmit the combined optic signals received by the first ordered optical network unit to a next ordered optical network unit; if no, transmitting the combined optic signals to a further next ordered optical network unit and executing step (2).

6. The method of claim 1, wherein the optic signals and the combined optic signals are transmitted in FDMA or TDMA ways.

7. The method of claim 1, wherein the method is applied to OFDMA-PON.

8. A signal transmission system for a peer-to-peer optical network, comprising:
   an optical line terminal for transmitting and receiving optic signals that have a single wavelength;
   an optical distribution node having a plurality of optical circulators connected and distributed in an order ring, one of the optical circulators connected to the optical line terminal; and
   a plurality of optical network units connected to the optical circulators in a one-to-one manner, a first ordered optical network unit receiving the optic signals from a first ordered optical circulator, capturing own dedicated downstream signals of the first ordered optical network unit from a plurality of downstream signals of the optic signals, combining the remaining downstream signals of the optic signals with own dedicated upstream signals of the first ordered optical network unit to generate combined optic signals, and transmitting the combined optic signals to the first ordered optical circulator, allowing the first order optical circulator to transmit via a next ordered optical circulator the combined optic signals to a next ordered optical network unit and to capture own dedicated downstream signals of the next ordered optical network unit and combine the downstream signals with own dedicated upstream signals of the next ordered optical network unit, and to allow a last ordered optical network unit to transmit the combined optic signals that comprise all of the upstream signals of the optical network units via a last ordered optical circulator to the optical line terminal.

9. The system of claim 8, wherein the optical network unit further comprises:
   a receiver for receiving the optic signals or the combined optic signals;
   a demodulator for demodulating the received optic signals or the combined optic signals;
   a processor for capturing from the optic signals or the combined optic signals dedicated downstream signals of the optical network unit and combining the remaining downstream signals of the optic signals or the combined optic signals except the dedicated downstream signals of the optical network unit with dedicated upstream signals of the optical network unit;
   a modulator for remodulating the signals combined by the processor to generate combined optic signals; and
   a transmitter for transmitting the combined optic signals.

10. The system of claim 8, wherein the optical circulator further comprises an optical detector for detect when the optic signals or the combined optic signals can be transmitted from the optical circulator to the optical network unit.

11. The system of claim 8, wherein the optical circulator are bypass optical circulators that transmits the optic signals or the combined optic signals directly to a next ordered optical circulator when each of the optical circulators cannot transmit the optic signals or the combined optic signals to the optical network unit.

12. The system of claim 8, wherein the optic signals and the combined optic signals are transmitted in FDMA or TDMA ways.

13. The system of claim 8, wherein the system is applied to OFDMA-PON.

* * * * *